US008200519B2

(12) United States Patent  (10) Patent No.: US 8,200,519 B2
Moel  (45) Date of Patent: Jun. 12, 2012

(54) SYSTEM AND METHOD FOR MANAGING SERVICE FACILITIES IN A SERVICE ENTERPRISE

(75) Inventor: Robert Moel, Plano, TX (US)

(73) Assignee: Time Warner Cable, Inc., New York, NY (US)

( * ) Notice: Subject to any disclaimer, the term of this patent is extended or adjusted under 35 U.S.C. 154(b) by 413 days.

(21) Appl. No.: 12/487,144

(22) Filed: Jun. 18, 2009

(65) Prior Publication Data

US 2009/0254394 A1 Oct. 8, 2009

Related U.S. Application Data

(63) Continuation-in-part of application No. 11/348,044, filed on Feb. 6, 2006, now abandoned.

(51) Int. Cl.
G06Q 10/00 (2012.01)
(52) U.S. Cl. .................................................. 705/7.12
(58) Field of Classification Search .................. 705/7.12
See application file for complete search history.

(56) References Cited

U.S. PATENT DOCUMENTS 6,876,992 B1 4/2005 Sullivan
6,957,211 B1 10/2005 Tyulenev et al.
2001/0047237 A1* 11/2001 Nakagawa et al. ........... 701/202

OTHER PUBLICATIONS

Jayaraman, Vaidyanathan, "An Efficient Heuristic Procedure for Practical-Sized Capacitated Warehouse Design and Management," Decision Sciences, Summer 1998, p. 729.*
Croxton, Keely L., and Zinn, Walter, "Inventory Considerations in Network Design," Journal of Business Logistics, 2005, p. 149.*
Jayaraman, Vaidyanathan, "Efficient Heuristic Procedure for Practical-Sized Capacitated Warehouse Design and Management," Decision Sciences, Summer 1998, p. 729.
Croxton, Keely L. & Zinn, Walter, "Inventory Considerations in Network Design," Journal of Business Logistics, 2005, p. 149.

* cited by examiner

*Primary Examiner* — Nathan Erb
(74) *Attorney, Agent, or Firm* — The Marbury Law Group, PLLC

(57) ABSTRACT

A system and method for optimizing the architecture of a service territory in a service enterprise. A management area has a fixed service call capacity to provide maintenance services to a subscriber base of the service enterprise. The cost of servicing the subscribers within the management area is measured by computing the driving cost and the restocking costs over a range of 1 to n service facilities using probability analysis. The optimal number of service facilities is determined by finding the lowest aggregate cost of servicing the subscribers over a range of 1 to "n" service facilities.

9 Claims, 3 Drawing Sheets

SYSTEM AND METHOD FOR MANAGING SERVICE FACILITIES IN A SERVICE ENTERPRISE

CROSS REFERENCE TO RELATED APPLICATIONS

This application is a continuation in part of application Ser. No. 11/348,044 filed Feb. 6, 2006, now abandoned. The application Ser. No. 11/348,044 is incorporated by reference herein, in its entirety, for all purposes.

BACKGROUND

Embodiments of the present invention provide systems and methods for establishing and supplying maintenance centers in support of enterprises that provide services to consumers, government agencies and businesses. For example, service enterprises may offer communications (wired telephone, wired Internet, wireless telephone, wireless internet, program distribution (satellite, cable, fiber, hybrid), and utilities (gas, electricity, water and sewer). Service enterprises typically rely of inventories of materials and components to provide service to customers with minimal interruption.

For example, a typical program distribution service operating over a hybrid-fiber network may utilize one or more hubs each serving 20,000 subscribers. A typical hub supports from 50 to 100 nodes with each node capable of serving 250 to 2000 subscribers. In order to maintain signal quality and quality of service commitments, trunk amplifiers maintain high signal quality. Internal bridger modules in the trunk amplifiers boost signals for delivery to subscribers' homes. Line Extender amplifiers maintain the high signal levels in cascade after the trunk amplifiers, through the neighborhoods. Taps divide out small amounts of signal for connection to the homes. Nominal cascade limits are up to 4 trunk amplifiers followed by up to 3 line extenders, with more in very rural areas. In suburban areas, cascades typically comprise 2 trunk and 2 line extenders. Because branching is unlimited, the total device count per node may be large despite short cascades. At the downstream end of the program distribution network is the customer premises equipment (CPE). Failure of any of these elements may result in a loss of service for the customer and a loss of revenue for the service provider.

The complexity of a service enterprise makes fault isolation and maintenance a challenging task. The task can be partitioned into four stages:
- determining that a failure has occurred or is imminent;
- determining what has failed;
- determining where in the failure is likely to be; and
- determining what equipment is required to remedy, or prevent, the failure.

Having determined that a problem in a service enterprise has occurred or is imminent, establishing efficient and cost effective systems for assuring the correction of the fault is a challenging task. Properly staffing and routing of field staff is essential to delivering high-quality in field service. Two decisions that determine the effectiveness of the field service are the size of the service area covered by a field service unit (determines the driving costs), and the size of the inventory of spare components that are shared by some number of field service units (determines the stocking and restocking costs).

SUMMARY

Embodiments of the present invention provide systems and methods for designing a cost efficient maintenance supply architecture for a service enterprise. According to this method, a finite (or fixed) service call capacity (expressed as "truck-rolls" or a "service call capacity") is shared among a variable number of service facilities or "quota groups" within a finite (or fixed) geographic area of interest (a "management area"). The fixed service call capacity is determined by the number of trucks, the inventory of parts, and the availability of service personnel. A restocking cost and an average driving cost are associated with the incremental change in the number of service facilities within the management area. The method optimizes the combined restocking and driving costs to arrive at a maintenance supply architecture for the management area in which the most cost effective number of service facilities is determined.

DETAILED DESCRIPTION

Figure 1:
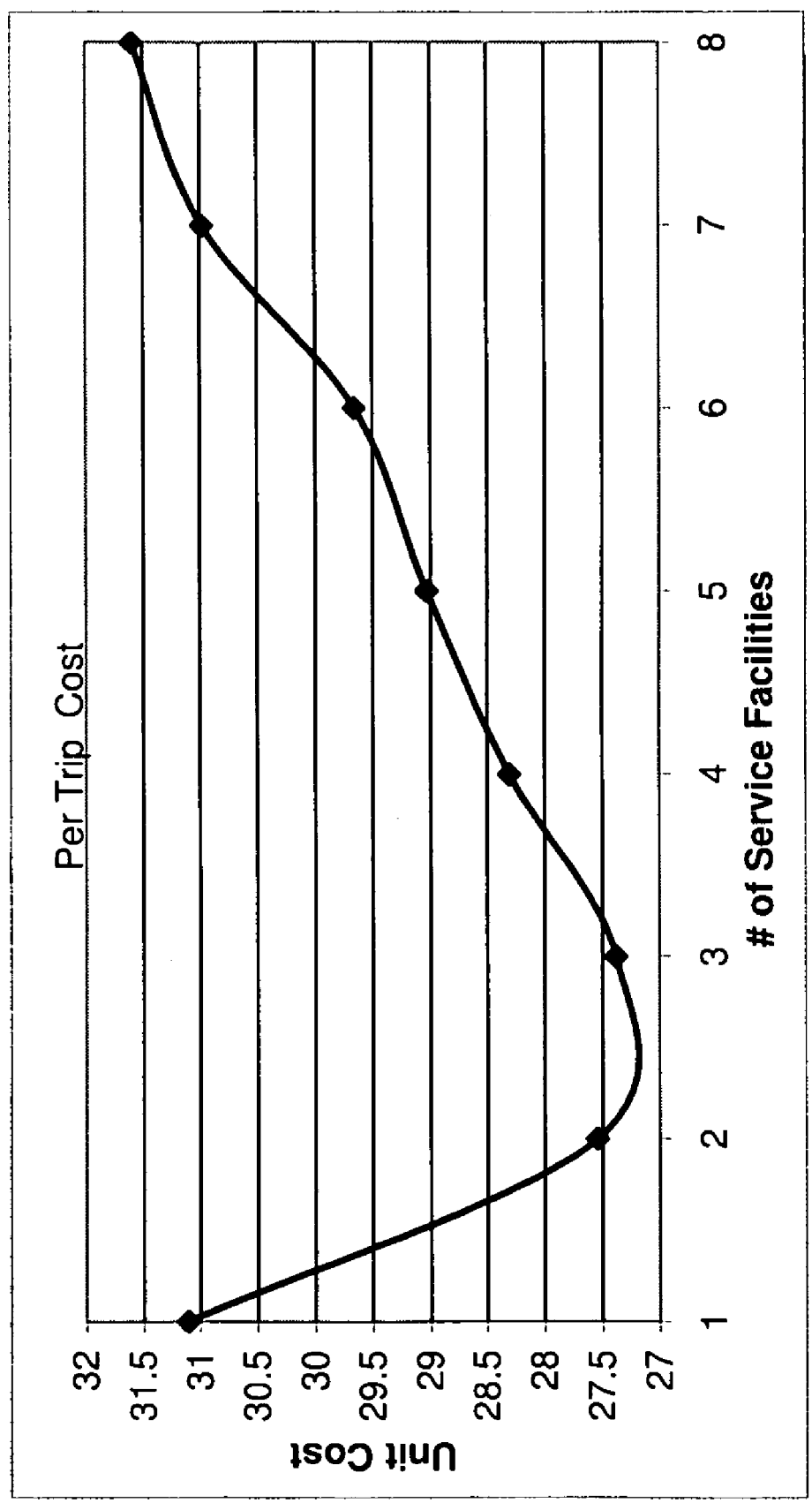
FIG. 1 illustrates a curve reflecting how the life of the service territory changes as the number of service facilities is increased according to an embodiment of the present invention.

The following terms are used in the description that follows. The definitions are provided for clarity of understanding:

| | |
|---|---|
| fixed service call capacity - | A measure of the capacity of a management area to respond to a request for maintenance from a subscriber within the management area. The size of the service call capacity is represented by "m" in the equations presented herein. |
| management area - | The area supported by a fixed service call capacity fixed of "truck-rolls." The management area is expressed as an area of "p" by "q" in the equations presented herein. |
| service facility - | A service facility (sometime referred to (as a "quota group") supported by the management area. The number of service facilities within a management area is expressed as the variable "n" in the equations presented herein. The "n" service facilities share the fixed service call capacity. |
| service territory - | A collection of management areas and service facilities that share the fixed service call capacity. |
| request rate - | The rate requests for service are received by a management area expressed in truck-rolls per hour. The rate is represented by the variable "θ" in the equations presented herein and is dependent on the number of subscribers located within the management area. |
| stock-out - | the number of times in a 24 hour day the service facility will exceed the service call capacity necessary to service the management area |
| stock-out cost - | The cost to replenish the service call capacity following a stock-out. |

An embodiment of the present invention provides a method for designing a cost efficient maintenance supply architecture for an HFC cable network. The embodiments rely on probabilistic functions to yield the desired result. Other approaches that seek optimal solutions that use linear programming or plain calculus are, by their very nature, deterministic. The variables described using these other methods do not take on probabilistic values that can vary randomly.

According to this method, a fixed service call capacity (expressed as "truck-rolls" or a "fixed service call capacity" and represented by the variable "m") is shared among a variable number "n" of service facilities within a fixed geographic area of interest referred to herein as a "management area."

The fixed service call capacity is determined by the number of trucks, the inventory of parts, and the availability of service personnel. A restocking cost and an average driving cost are associated with the incremental change in the number service facilities within the management area. The method optimizes the combined restocking and driving costs to determine a maintenance supply architecture management area in which the most cost effective number of service facilities is determined.

Probability theory teaches that an expected value of a function g(x) in one-dimension may be defined as follows:

$$E(g(x)) = \int_{-\infty}^{\infty} g(x) f_x(x) dx \quad \text{(Equation 1)}$$

where $f_x(x)$ is the probability density function of x.

This equation can be generalized to multiple dimensions as is the case of the Equations 2 and 3 below where the following are the probability density functions:

$$f_{x_1}(x_1) = \frac{1}{p} \text{ defined over } 0 \leq x_1 \leq p$$

$$f_{x_2}(x_2) = \frac{1}{p} \text{ defined over } 0 \leq x_2 \leq p$$

$$f_{y_1}(y_1) = \frac{1}{q} \text{ defined over } 0 \leq y_1 \leq q$$

$$f_{y_2}(y_2) = \frac{1}{q} \text{ defined over } 0 \leq y_2 \leq q$$

For example, for a management area of a given size and aspect ratio, the expected driving distances for service calls that are uniformly but randomly distributed in a rectangle of dimensions p and q is:

$$\int_0^q \int_0^q \int_0^p \int_0^p \frac{\sqrt{(x_1-x_2)^2 + (y_1-y_2)^2}}{p^2 q^2} dx_1 dx_2 dy_1 dy_2 \quad \text{(Equation 2)}$$

where $$g(x_1, x_2, y_1, y_2) = \sqrt{(x_1-x_2) + (y_1-y_2)^2}$$

The points $(x_1, y_1)$ and $(x_2, y_2)$ make up the random points. The distances of these line segments are then averaged.

Another, perhaps slightly more realistic travel distance formulation would assume only right angled travel was permitted. Cities are laid out in grids and, typically, diagonal travel is not possible. The equation for that expected value would be:

$$D(p,q) = \int_0^q \int_0^q \int_0^p \int_0^p \frac{|(x_1-x_2)| + |(y_1-y_2)|}{p^2 q^2} dx_1 dx_2 dy_1 dy_2 \quad \text{(Equation 3)}$$

Where "D(p,q)" is the average driving distance between points with area "p×q" and $g(x_1, x_2, y_1, y_2) = |x_1-x_2| + |x_2+|y_1-y_2|$.

The solution of Equation 3 has a simple closed form solution indicated below:

$$D(p,q) = p/3 + q/3 \quad \text{(Equation 4)}$$

The larger the land area, the longer the average driving distance will be. Another fact that is evident from Equation 4 is that two management areas may have the same areas but different average driving distances. By way of illustration, an equilateral management area having p=q=2 has 1.33 as its average distance while a management area having p=4 and q=1 will have an average driving distance of 1.67 or nearly 25% longer average travel distances.

A cost of travel may be derived from the average trip distance computed for a particular management area. The driving cost "$C_d$" is:

$$C_d = D(p,q) * C_{fleet} * P * \rho / 30.25 \quad \text{(Equation 5)},$$

where D(p,q) is the average trip in miles for an area of "p"×"q" square miles, P is the number of subscribers with the area, $C_{fleet}$ is the driving cost in monetary units per mile, ρ is the monthly service call rate for the area, and 30.25 is the average days in a calendar month.

Thus, for an area 1 miles by 4 miles having a single service facility serving 1000 customers, a monthly service call rate of 302.5 and a driving cost of $1.00 per mile, the daily driving cost is $16,700 (e.g., [⅓+4/3]*$1.00*302.5/30.25*1000). Whereas, if the area is 2 miles by 2 miles and all other factors are the same, the driving cost is $13,333 (e.g., [⅔+⅔]*$1.00*302.5/30.25*1000).

If average driving distance were the only factor, management areas would be made as small as possible because driving distances would be minimized. However, dividing a management area into smaller zones while keeping the fixed service call capacity constant increases the probability that one of the smaller zones will exhaust its allotment of inventory sooner.

By way of illustration, a management area of "n" service facilities is served by a fixed service call capacity of "m." Each request for service arrives following a Gamma distribution at θ requests per unit time. If no new inventory is added to the fixed service call capacity until the inventory reaches zero, the average time for the fixed service call capacity to be exhausted is determinable by application of the Erlang distribution (the integer version of the Gamma distribution). The probability density function for this distribution is:

$$f_x(x) = \frac{\theta^m x^{m-1} e^{-\theta x}}{\Gamma(m)}, x \geq 0 \quad \text{(Equation 6)}$$

Equation 6 provides a probability that a management area served by a fixed service call capacity of a size "m" will be exhausted within a time "x."

The expected life of a single service facility within the management area is:

$$\frac{m}{\theta}, \quad \text{(Equation 7)}$$

where
m is the inventory size and θ the request rate for inventory within the service facility.

Equation 7 represents the time a single service facility with access to a fixed service call capacity of "m" truck-rolls in an environment where requests for service arrive at a rate of "θ" requests for truck-rolls per hour will last on average until the service facility is exhausted.

As noted, the fixed service call capacity "m" may be spread across one or several service facilities within the management area. Assuming that a management area is functioning if each service facility has available units and fails if any one service facility fails, and that the expected life of a single service facility follows a gamma distribution, the expected life and variance of a given management area can be determined. Stated another way, the average life of "n" service facilities subject to uniform requests whose rate is dependant upon the number of customers in a management area can be determined using probability analysis.

$$\Xi(x) := 1 - \left[1 - \int_0^x \left(\frac{\theta}{n}\right)^{\frac{m}{n}} \cdot x^{\left(\frac{m}{n}\right)-1} \cdot \frac{\exp\left(x \cdot \frac{-\theta}{n}\right)}{\Gamma\left(\frac{m}{n}\right)} dx\right]^n \quad \text{(Equation 8)}$$

This cumulative distribution function, Big-Chi, computes the probability of n-chained service facilities living to x time. The expected value of Big-Chi is:

$$E(x) := \int_0^\infty x \cdot \left[\frac{d}{dx}(\Xi(x))\right] dx \quad \text{(Equation 9)}$$

and the second moment of Big-Chi is:

$$E(x^2) := \int_0^\infty x^2 \cdot \left(\frac{d}{dx}\Xi(x)\right) dx \quad \text{(Equation 10)}$$

Figure 2:
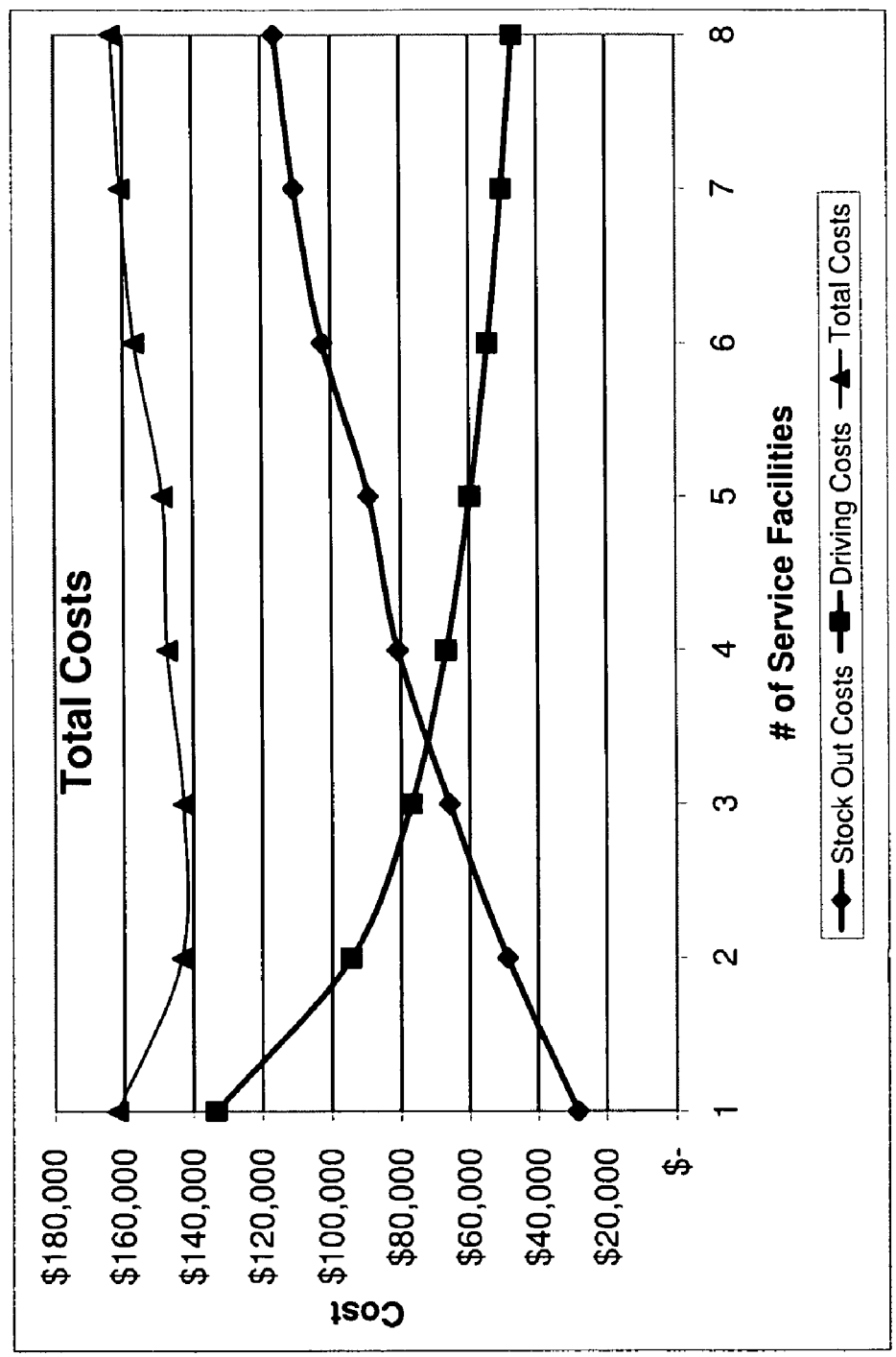
FIG. 2 illustrates an analysis of service territory costs for a particular set of factors according to an exemplary embodiment of the present invention.

FIG. 2 illustrates a curve reflecting how the life of the management area changes as the number of service facilities is increased according to an embodiment of the present invention. Referring to FIG. 2, the request rate ($\theta$) for the management area is assumed to be $\theta=4$ requests/hour and size of the service call capacity is assumed to be 200. As the number of service facilities is increased from 1 to 20, the life of the management area, on average, is cut by 50%. Said another way, the probability that a management area with 10 service facilities with 200 units spread across them and a request rate of 0.4 per hour ($\theta/n=4/10=0.4$) fails after 25 hours is 3.4% but, the probability that a management area with 20 service facilities and a request rate of 0.2 per hour ($\theta/n=4/20=0.2$) and the other elements the same fails is 47.6%.

If L is the expected life in hours of a service facility, then the number of times in a 24 hour day the service facility will exhaust the fixed service call capacity necessary to serve the management area (herein, a "stock-out") is 24/L). If the cost per stock-out is "$C_s$," then the total daily restocking cost (or stock-out cost) is $24/L * C_s$.

In an embodiment of the present invention, the total management area costs equal the "stock-out cost" plus the driving cost of all of its "n" service facilities. The optimum architecture of a management area in terms of the most cost effective number of service facilities can be determined by analyzing the management area costs as a function of the number of service facilities.

FIG. 2 illustrates an analysis of management area costs for a particular set of factors according to an exemplary embodiment of the present invention. In this exemplary embodiment of the present invention, the management area analysis was derived using the factors set forth in Table 1 below:

TABLE 1

| | |
|---|---|
| Cost Per Mile | $ 0.70 |
| Stock Out Cost | $ 300.00 |
| Stranding Costs | $ 5.00 |
| Total Width of Management Area ("p") | 75.00 |
| Total Height of Management Area ("q") | 35.00 |
| Total Fixed service call capacity ("m") | 840 |
| Number of Trips | 5200 |
| Ave. Req. Rate ("$\theta$") | 15 |

Table 2 illustrates the management area costs where the number of service facilities ("n") within the management area is varied from 1 to 8. In this exemplary embodiment of the present invention, the service call capacity is spread evenly over the number of service facilities. In calculating the driving cost over the range of 1 to n, the management area is divided into rectangles having dimensions that are proportional to the undivided management area.

TABLE 2

| Service Facilities | Stock-out Costs | Driving Costs | Total Costs | Per Trip |
|---|---|---|---|---|
| 1 | $ 27,750.00 | $133,466.67 | $161,216.67 | $31.00 |
| 2 | $ 49,360.00 | $ 94,375.19 | $143,735.19 | $27.64 |
| 3 | $ 64,415.00 | $ 77,057.02 | $141,472.02 | $27.21 |
| 4 | $ 80,095.00 | $ 66,733.33 | $146,828.33 | $28.24 |
| 5 | $ 91,892.00 | $ 59,688.11 | $151,580.11 | $29.15 |
| 6 | $102,480.00 | $ 54,487.54 | $156,967.54 | $30.19 |
| 7 | $110,645.00 | $ 50,445.66 | $161,090.66 | $30.98 |
| 8 | $117,015.00 | $ 47,187.59 | $164,202.59 | $31.58 |

Table 2 reflects the competition between the stock-out costs and the driving costs. As the number of service facilities increases, the average driving distance and driving costs decreases. On the other hand, the stock-out costs increase with the increased probability that a service facility will "stock out" as the number of service facilities increases. In this exemplary embodiment of the present invention, the optimum per trip costs and the optimum total costs are achieved when the number of management areas (and hence, the number of service facilities) is three.

Figure 3:
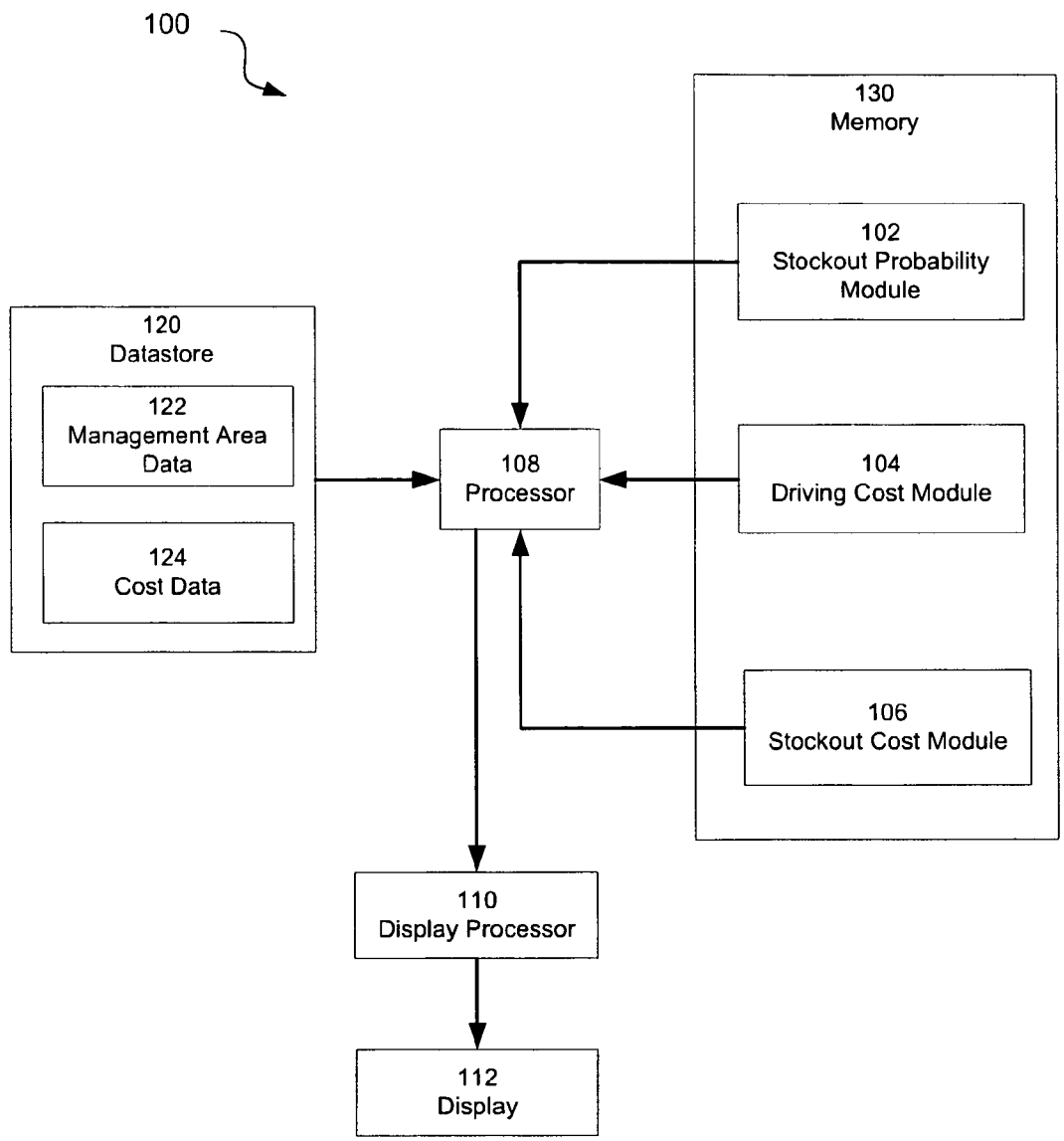
FIG. 3 is a block diagram illustrating an optimization processor according to an embodiment.

FIG. 3 illustrates components of an optimization system 100 that may be used to determine an optimum total service territory cost according to an embodiment. A datastore 120 has stored therein management area data 122 and cost data 124. In an embodiment, the management area data 122 may include a total width of the management area ("p"), a total height of management area ("q"), a total fixed service call capacity ("m"), a range of a number of management areas within a service territory (1 to n), a number of trips, and an average request rate ("$\theta$"). In an embodiment, the cost data may include the cost per mile, the stock out cost and the stranding cost.

Stored in a memory 130 are a stock-out probability module 102, a driving cost module 104 and a stock-out cost module 106. These modules may be executed by a processor 108 using data supplied by the datastore 120. The processor 108 produces a result using the equations described above that may be supplied to a display processor 110 and displayed on a display 112. By way of illustration and not by way of limitation, the results may be the elements of Table 2.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order.

Further, words such as "thereafter," "then," "next," etc. are not intended to limit the order of the steps; these words are simply used to guide the reader through the description of the methods.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of the computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module which may reside on a computer-readable medium. Computer-readable media includes both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disc storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the scope of the invention. Thus, the present invention is not intended to be limited to the embodiments shown herein but is to be accorded the widest scope consistent with the principles and novel features disclosed herein. Further, any reference to claim elements in the singular, for example, using the articles "a," "an," or "the," is not to be construed as limiting the element to the singular.

What is claimed is:

1. A method for managing service facilities in a service enterprise comprising:
    defining a management area of size "p" by "q" comprising a range of 1 to "n" service facilities served by a fixed service call capacity of a size "m";
    calculating, by a computer processor, over the range of 1 to n, the following values:
        a restocking cost, for each value of n being considered, equal to the sum of the values of [(24/L) times $C_s$] for all service facilities for that particular value of n, wherein L is the expected life in hours of the respective service facility, 24 is the number of hours in a day, and $C_s$ is a cost per stock-out for the respective service facility;
        a driving cost, for each value of n being considered, based on the size of the management area in which the n service facilities are located;
        a management area cost, for each value of n being considered, equal to the sum of the restocking cost and the driving cost for each value of n; and
        an integer value of n within the range of 1 to n associated with the lowest management area cost (herein, $n_{opt}$); and
    establishing the service territory with $n_{opt}$ management areas.

2. The method of claim 1, wherein computing a driving cost based on the size of the management area in which the n service facilities are located comprises computing an average expected driving distance over the size of the management area and computing the product of the average expected driving distance and a cost per unit of distance.

3. The method of claim 2, wherein the average expected driving distance D(p,q) equals p/3+q/3, and wherein the driving distance is constrained by an assumption that only right angle travel within the management area is permitted.

4. The method of claim 1, wherein the service enterprise is selected from the group consisting of a cable television service, a video on demand service, an electrical power service, a water supply service, and a fuel supply service.

5. The method of claim 1 further comprising displaying over the range of 1 to n the restocking cost, the driving cost, the management area cost, and $n_{opt}$.

6. The system of claim 1, wherein the service enterprise is selected from the group consisting of a cable television service, a video on demand service, an electrical power service, a water supply service, and a fuel supply service.

7. A system for managing service facilities in a service enterprise comprising:

a first processor, wherein the first processor is configured with software executable instructions to cause the processor to compute, for a management area of size "p" by "q" comprising a range of 1 to "n" service facilities served by a fixed service call capacity of a size "m," over the range of 1 to n:

a restocking cost, for each value of n being considered, equal to the sum of the values of $[(24/L)$ times $C_s]$ for all service facilities for that particular value of n, wherein L is the expected life in hours of the respective service facility, 24 is the number of hours in a day, and $C_s$ is a cost per stock-out for the respective service facility;

a driving cost, for each value of n being considered, based on the size of the management area in which the n service facilities are located;

a management area cost, for each value of n being considered, equal to the sum of the restocking cost and the driving cost for each value of n; and an integer value of n within the range of 1 to n associated with the lowest management area cost (herein, $n_{opt}$); and a second processor, wherein the second processor is configured with software executable instructions to cause the second processor to display over the range of 1 to n the restocking cost for each value of n being considered, the driving cost for each value of n being considered, the management area cost for each value of n being considered, and $n_{opt}$.

8. The system of claim 7, wherein the instruction for computing a driving cost based on the size of the management area in which the n service facilities are located comprises an instruction for computing an average expected driving distance over the size of the management area and computing the product of the average expected driving distance and a cost per unit of distance.

9. The system of claim 8, wherein the average expected driving distance $D(p,q)$ equals $p/3+q/3$, and wherein the driving distance is constrained by an assumption that only right angle travel within the management area is permitted.

* * * * *